United States Patent [19]

Barbagli et al.

[11] Patent Number: 5,004,060
[45] Date of Patent: Apr. 2, 1991

[54] TRACKED VEHICLE WITH AN EPICYCLIC STEERING DIFFERENTIAL

[75] Inventors: Rino Oreste Barbagli; Giorgio De Castelli, both of Borgaretto, Italy

[73] Assignee: Fiatgeotech S.p.A., Modena, Italy

[21] Appl. No.: 263,300

[22] Filed: Oct. 27, 1988

[51] Int. Cl.⁵ .............................................. B62D 11/18
[52] U.S. Cl. ..................... 180/6.44; 475/23; 475/28
[58] Field of Search ............ 180/6.44, 6.2, 6.24, 180/6.26, 6.3, 6.32, 6.48; 475/23, 28

[56] References Cited

U.S. PATENT DOCUMENTS

| | | | |
|---|---|---|---|
| 3,371,734 | 3/1968 | Zaunberger et al. | 475/23 |
| 3,450,218 | 6/1969 | Looker | 180/6.44 |
| 3,530,741 | 9/1970 | Charest | 475/28 |
| 4,718,508 | 1/1988 | Tervola | 180/6.44 |
| 4,813,506 | 3/1989 | Smith | 180/6.44 |

FOREIGN PATENT DOCUMENTS

| | | | |
|---|---|---|---|
| 1154724 | 9/1963 | Fed. Rep. of Germany | 475/28 |
| 2053698 | 5/1972 | Fed. Rep. of Germany | 180/6.44 |
| 2055380 | 5/1972 | Fed. Rep. of Germany | 180/6.44 |
| 1147142 | 10/1960 | France | 475/23 |
| 2540058 | 8/1984 | France | 180/6.44 |
| 32528 | 3/1978 | Japan | 180/6.44 |
| 653162 | 3/1979 | U.S.S.R. | 180/6.44 |
| 1399203 | 5/1988 | U.S.S.R. | 180/6.44 |
| 933125 | 8/1963 | United Kingdom | 475/28 |
| 8200867 | 3/1982 | World Int. Prop. O. | 475/23 |

*Primary Examiner*—Mitchell J. Hill
*Attorney, Agent, or Firm*—Sughrue, Mion, Zinn, Macpeak & Seas

[57] ABSTRACT

A tracked vehicle is provided with an epicyclic steering differential interposed between the internal combustion engine and the track drive wheels. A reversible hydraulic motor is operatively associated with the differential for operating the steering of the vehicle. The differential includes a double epicyclic train which divides the torque from the internal combustion engine. The hydraulic motor acts on two elements of the train which are connected for rotation with each other about the central axis of the differential, and which rotate in equilibrium with each other when the vehicle is travelling a straight line.

2 Claims, 5 Drawing Sheets

TRACKED VEHICLE WITH AN EPICYCLIC STEERING DIFFERENTIAL

BACKGROUND OF THE INVENTION

The present invention relates to a tracked vehicle including an internal combustion engine, an epicyclic steering differential driven by the engine and adapted to rotate the drive wheels, and a reversible auxiliary motor operatively associated with the differential for operating the steering of the vehicle.

In vehicles of the above type, the rotation in one sense or the other of the auxiliary motor which acts on an input shaft of the differential steers the vehicle to the right or the left with considerably less power loss than is typical of well-known traditional epicyclic or brake-and-clutch steering systems.

On the other hand, systems with such epicyclic steering differentials are quite complex and bulky and include a large number of associated epicyclic trains.

SUMMARY OF THE INVENTION

The object of the present invention is to provide, a tracked vehicle having an epicyclic steering different which does not have the above disadvantages and which is simple, compact and cheap to produce.

According to the invention, this object is achieved by virtue of the fact that the differential includes first and second epicyclic trains having a common central axis and each provided with three mutually cooperating elements (a sun gear, a planet carrier, a ring gear); the internal combustion engine drives the differential in correspondence with two first elements (a ring gear and a planet carrier) of the first and second epicyclic trains respectively, which are fast for rotation with each other about the central axis; the auxiliary motor is associated with the differential in correspondence with two second planetary elements of the first and second epicyclic trains, which are fast for rotation with each other about the central axis; the differential rotates the drive wheels in correspondence with two third elements (a planet carrier and a ring gear) of the first and second epicyclic trains respectively; speed reduction means are interposed between the third elements and the driving wheels for re-equilibrating the driving torques and the rates of rotation.

By virtue of the above characteristics, the driving torque input to the differential is distributed to two elements of the trains which are fast with each other for rotation, producing a very reliable differential. Moreover, the said two second elements which are adapted to be rotated by the auxiliary motor do not require braking when the auxiliary motor is stopped, since they are in equilibrium with forces opposing rotation between them when the vehicle is travelling in a straight line with equal torques required at the drive wheels.

The steering differential of the vehicle according to the invention does not require the use of brakes or clutches to steer the vehicle, which is entirely to the benefit of an efficient transfer of driving torque to the tracks, even in conditions of non-straight-line travel.

Preferably, the first two elements of the trains are respectively the ring gear of the first train and the planet carrier of the second train and the second two elements are the respective sun gears of the first and second trains.

BRIEF DESCRIPTION OF THE DRAWINGS

Further characteristics and advantages of the present invention will become clear from the detailed description which follows with reference to the appended drawings, provided by way of non-limiting example, in which.

DETAILED DESCRIPTION OF THE INVENTION

Figure 1:
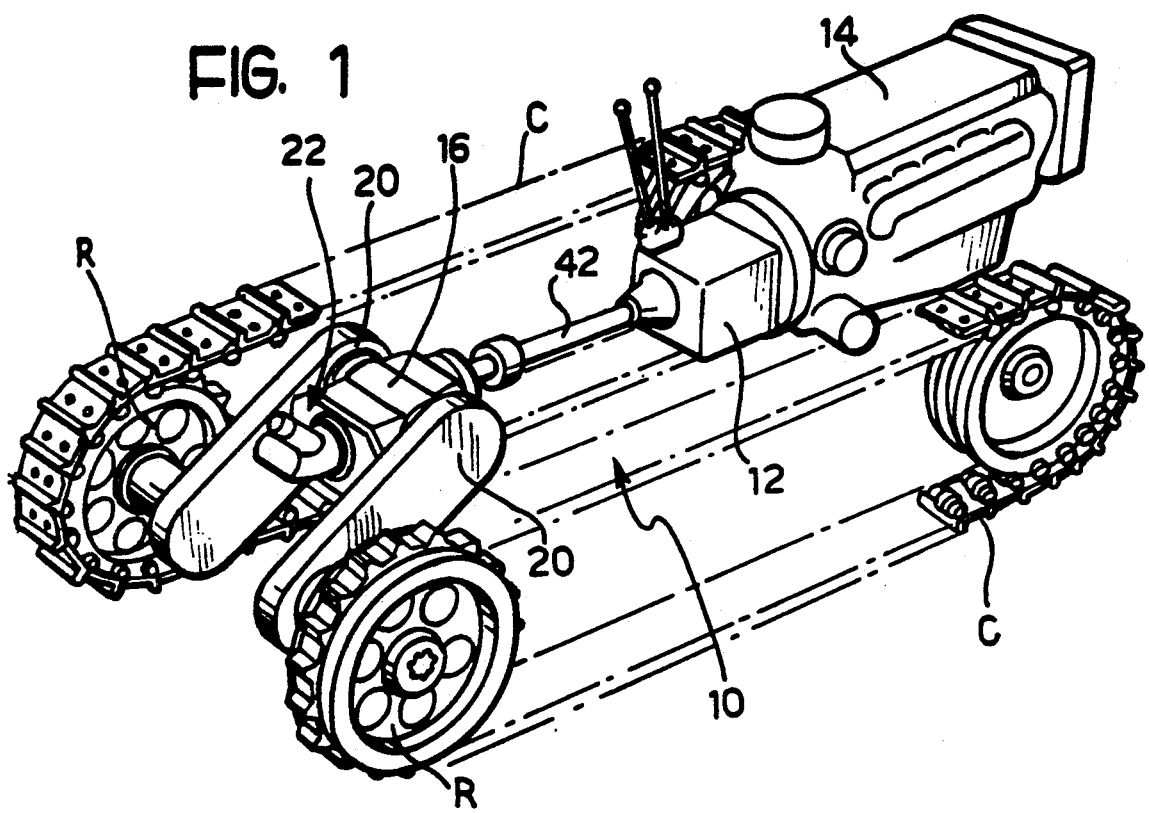
FIG. 1 is a schematic perspective view which shows a tracked vehicle provided with a transmission system according to the invention.
Figure 2:
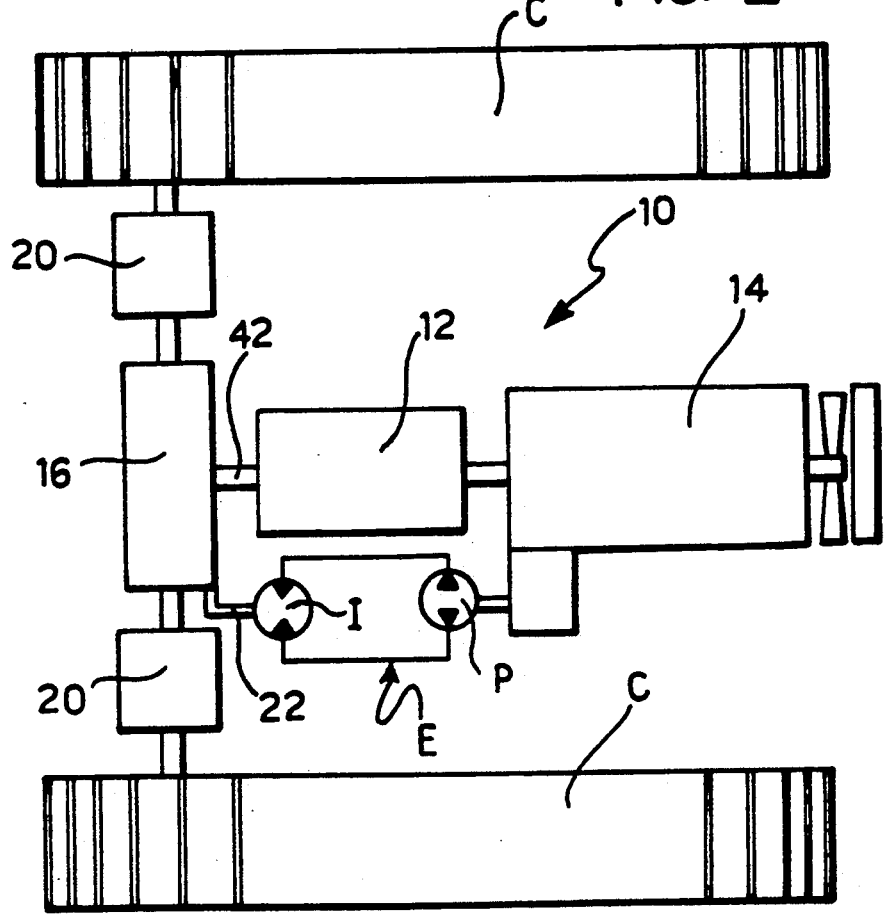
FIG. 2 is a block diagram of the transmission system of the vehicle of FIG. 1.

With reference to the drawings, a transmission system for tracked vehicles is generally indicated 10 and includes a gearbox 12 connected to an internal combustion engine 14, a differential 16 connected to the gearbox 12 by means of a transmission shaft 42, and a pair of gear reduction units 20 interposed between the differential 16 and the drive wheels R. The differential 16 is operatively connected at 22 to a hydraulic motor I driven by a hydraulic pump P which is in turn driven by the internal combustion engine 14 through a hydraulic circuit E.

As will be explained in the description below, the reversible hydraulic motor I provides for the steering of the tracked vehicle by the differentiation of the speeds of the drive wheels R and of the tracks C associated therewith.

The differential 16 includes a casing 24 which is fixed firmly to the structure of the vehicle and contains first and second epicyclic trains, A and B respectively, having a common central axis X-X. The first epicyclic train A is constituted by a central sun gear 26, a planet carrier 28, planet gears 30 supported for rotation by the planet carrier 28 and meshed with the sun gear 26, and by an internally-toothed ring gear 32 meshed with the planet gears 30. Similarly, the second epicyclic train B includes a central sun gear 34, a planet carrier 36 which supports planet gears 38 for rotation, and an internally-toothed ring gear 49.

The planet carrier 28 is rotated about the axis X—X by the drive shaft 42 arranged longitudinally of the tracked vehicle and on which a brake F is mounted through a pair of bevel gears 42a. The planet carrier 28 of the first epicyclic train A is connected for rotation with the ring gear 49 of the second epicyclic train B by means of one gear of the pair of bevel gears 42a. Moreover, the sun gear 26 of the first train A is rigidly connected to the sun gear 34 of the second train B and both are rotated by the hydraulic motor I by means of a drive shaft 43. The ring gear 32 of the first train A is connected for rotation with a bevel gear 32a which is meshed with a corresponding bevel gear 33 keyed to a first output shaft 35 mounted for rotation relative to the casing 24 of the differential and adapted to drive one of the reduction units 20. Similarly, a bevel gear 36a is keyed to the planet carrier 36 of the second train B and is adapted to cooperate with a corresponding bevel gear 37 keyed to a second output shaft 39 of the differential 16 and adapted to drive the reduction unit 20 associated with one of the tracks C.

Figure 4:
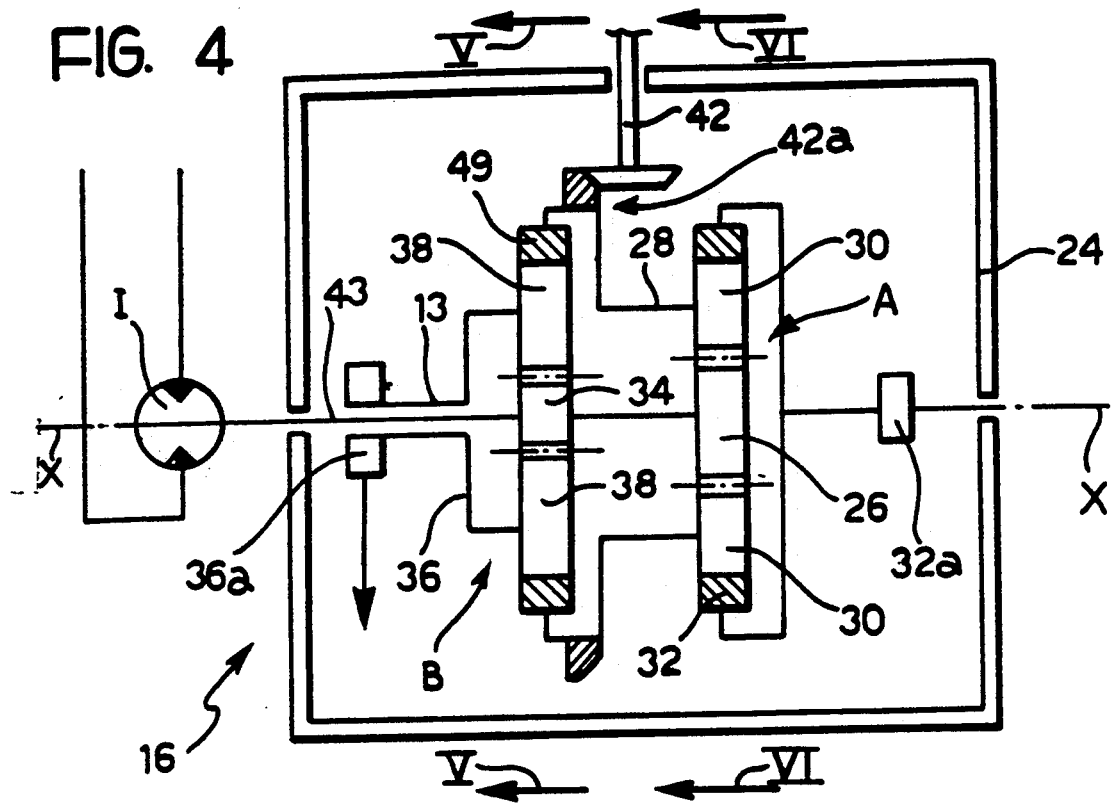
FIG. 4 is a schematic view of a differential similar to that of FIG. 3.
Figure 3:
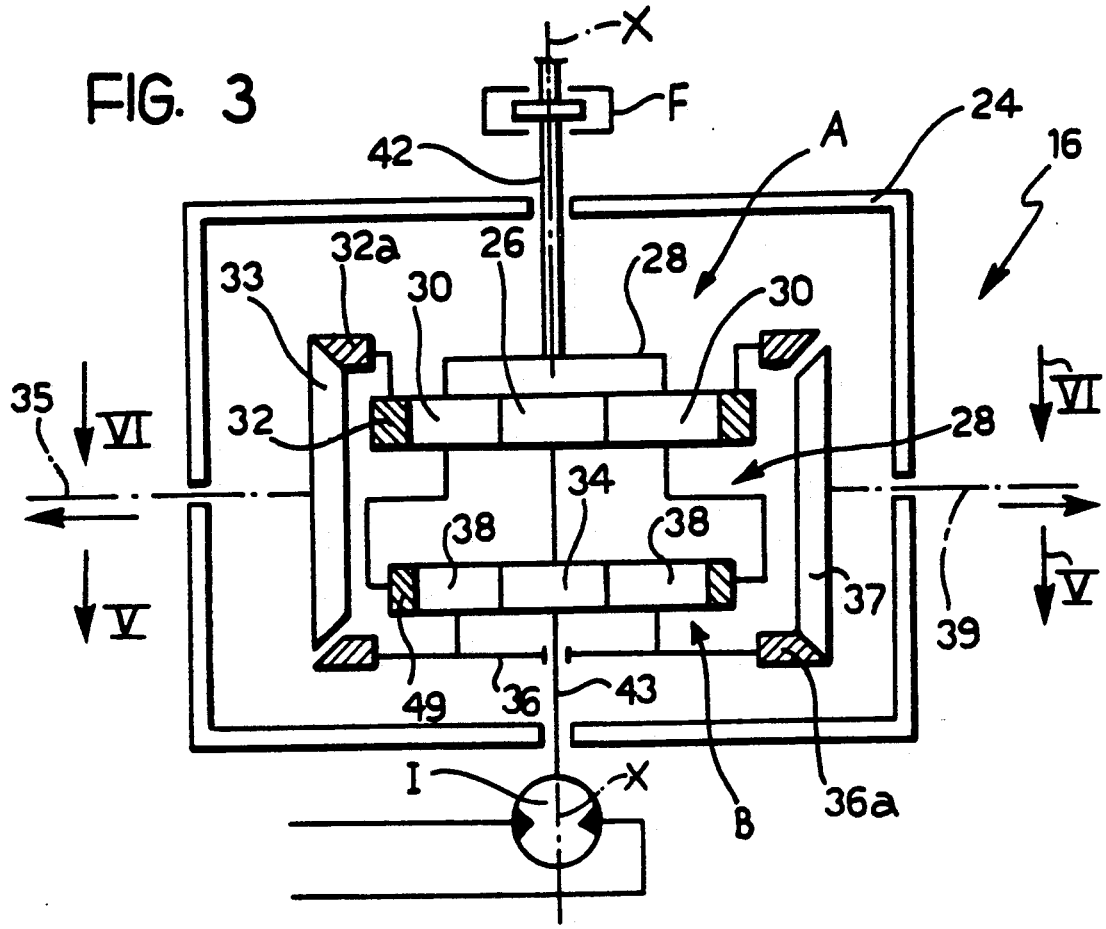
FIG. 3 is a schematic plan view of the differential of FIGS. 1-2.

The differential illustrated in FIG. 4 is similar to that illustrated in FIG. 3, with the single substantial difference that the common axis X—X of the two trains A and B is arranged transverse the shaft 42 driven by the engine 14. In FIG. 4, the similar components are indicated by the same reference numerals as used up to now. The drive shaft 42 simultaneously rotates the planet carrier 28 of the first train A and the ring gear 49 of the second train B by means of a pair of bevel gears 42a. The drive from the differential 16 is output to the reduction units 20 in correspondence with the gear 32a which is connected for rotation with the ring gear 32 of the first train A. Similarly, the gear 36a for driving the corresponding reduction unit 20 is keyed to the planet carrier 36 of the second train B, coaxially with the axis X—X, by means of a hollow shaft 13. The drive shaft 43 connected to the hydraulic motor I is mounted for rotation coaxially with the hollow shaft 13.

Figure 5:
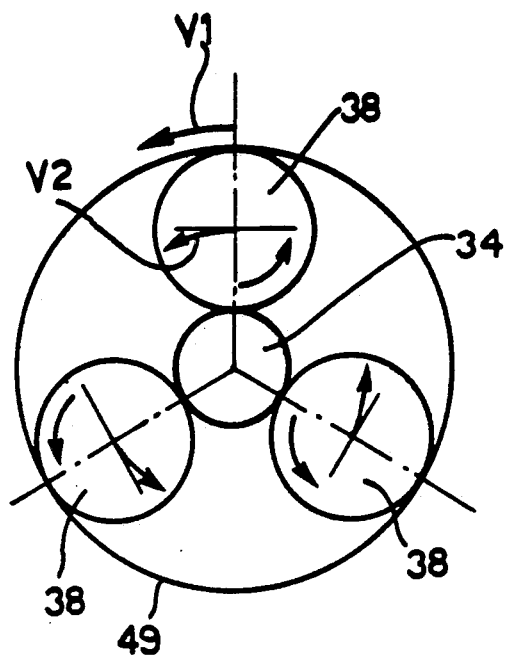
FIG. 5 is a schematic elevational view of the epicyclic train B as viewed in the direction of the arrows V in FIGS. 3 and 4 with the differential in a condition corresponding to the advance of the vehicle in a straight line.

With reference to FIG. 5, the tangential velocity input to the differential 16 in correspondence with the ring gear 49 of the second train B is indicated $V_1$; similarly, the tangential velocity of the planet carrier 36 of the second train B is indicated $V_2$. In the same way, in FIG. 6, $V_3$ indicates the tangential velocity of the ring gear 32 rotated by the planet gears 30 carried by the planet carrier 28 which has a tangential velocity indicated $V_4$. The condition illustrated in FIGS. 5 and 6 relates to the condition in which the vehicle is moving in a straight line, wherein the sun gears 26 and 34 are stationary and give rise to identical and opposite reaction torques (with equal torques required by the tracks C). In this case, the hydraulic motor I is not subject to any reaction force. Since the angular velocities of rotation of the ring gear 32 of the first train A and of the planet carrier 36 of the second train B are different from each other, the bevel or spur gears, together with the reduction units 20, must ensure an equal rate of rotation of the drive wheels R.

Figure 6:
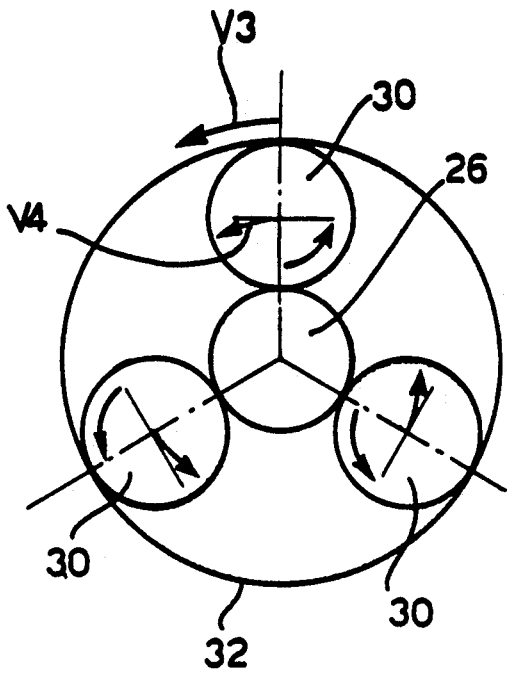
FIG. 6 is a schematic elevational view of the epicyclic train A as viewed in the direction of the arrows VI in FIGS. 3 and 4 with the differential in a condition corresponding to the advance of the vehicle in a straight line.
Figure 7:
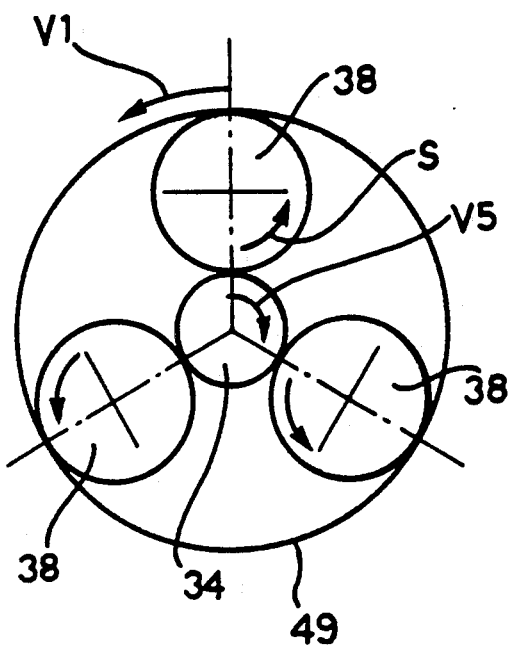
FIG. 7 is a schematic view similar to FIG. 5 and shows the differential in a condition corresponding to the steering of the vehicle to the left.
Figure 8:
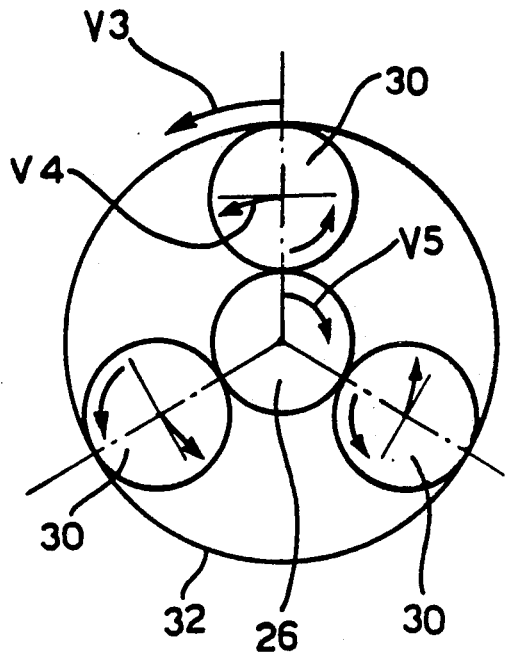
FIG. 8 is schematic similar to FIG. 6 and shows the differential in a condition corresponding to the steering of the vehicle to the left.

FIGS. 7-8, which are similar to FIGS. 5 and 6, show the configuration of the differential 16 during steering to the left with a steering radius, relative to the centre line of the vehicle, equal to half the gauge (inner track stopped). In order to achieve this steering, the reversible hydraulic motor I must rotate the sun gears 34 and 26 with a tangential velocity $V_5$ which is at a predetermined ratio to the tangential velocity $V_3$ of the ring gear 49 of the second train B. The velocity of rotation of the planet carrier 36 of the second epicyclic train B is thus cancelled out (the rotation of the planet gears 38 about themselves is shown by the arrow S in FIG. 7). The left-hand track is therefore stopped. The velocity $V_5$ of the sun gear 26 of the first train A causes an increase in the velocity of the ring gear 32 of the first train A with a consequent doubling of the tangential velocity $V_3$ of the ring gear 32. The result is that the speed of advance of the right-hand track is doubled with respect to the condition of movement in a straight line, enabling the desired steering to be achieved.

Figure 9:
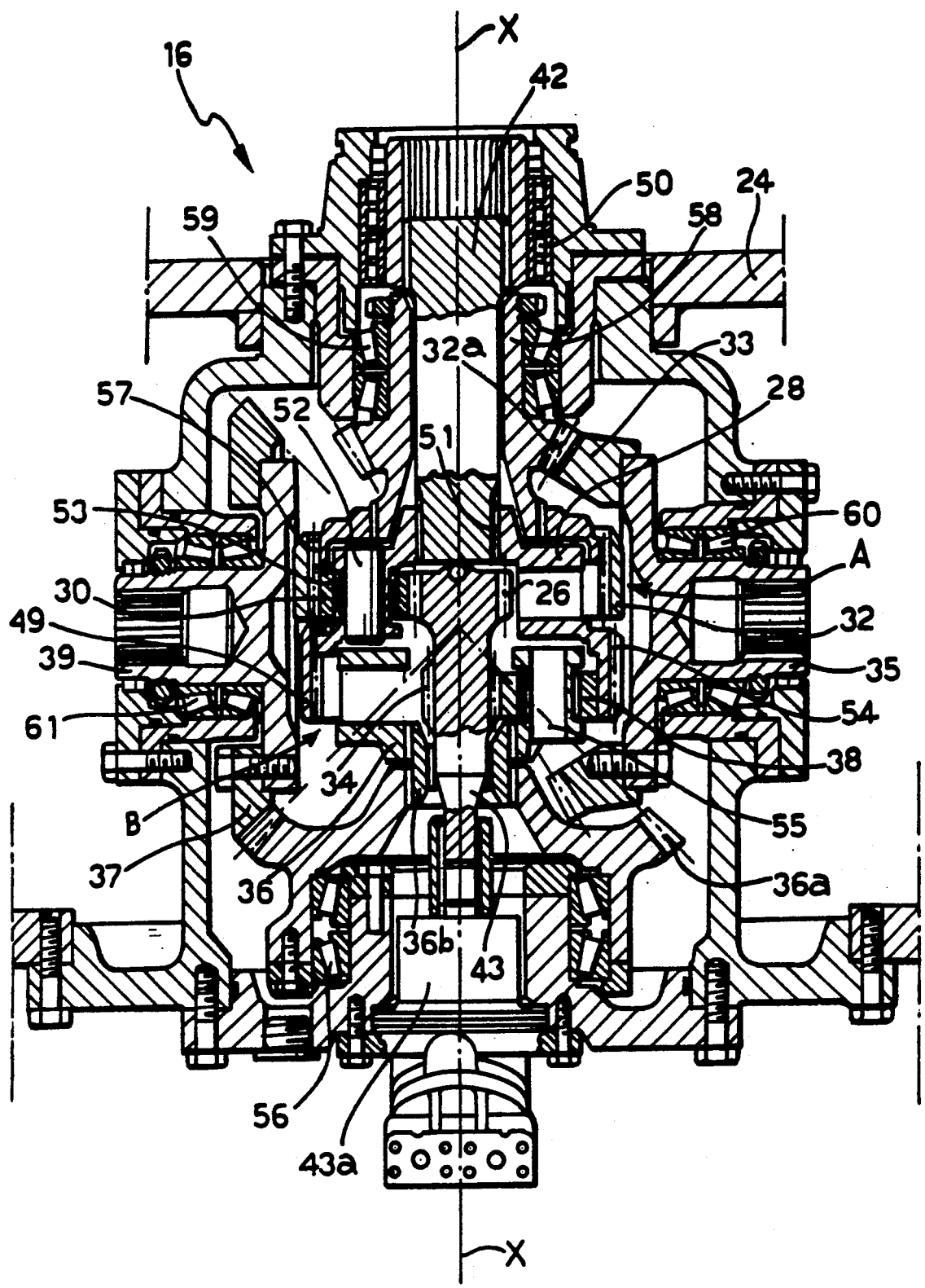
FIG. 9 is a partially-sectioned plan view of a differential produced according to the diagram of FIG. 3.

FIG. 9 shows a differential 16 which corresponds to the diagram of FIG. 3. The drive shaft 42 is mounted for rotation relative to the casing 24 of the differential with the interposition of the cylindrical rolling bearings 50 and is keyed at 51 to the planet carrier 28 which carries three pins 52 arranged at 120° to each other, on which the planet gears 30 are mounted with the interposition of rolling bearings 53. The planet carrier 28 is keyed at 54 to the internally-toothed ring 49 which faces the ring gear 32 and is adapted to cooperate with the planet gears 38. The latter are mounted for rotation on pins 55 fixed firmly to the planet carrier 36 which has a tubular portion 36b and a portion 36a which is formed as a ring bevel gear. The planet carrier 36 is mounted for rotation relative to the casing 24 with the interposition of tapered roller bearings 56.

The drive shaft 43 connected at 43a to the hydraulic motor I is inserted in correspondence with the tubular portion 36b of the planet carrier 36 and two gears constituting the sun gears 26 and 34 are keyed thereto. The planet gears 30 of the first epicyclic train A mesh with the ring gear 32 which is keyed at 57 to a tubular element 58 mounted coaxially with the shaft 42 for rotation relative to the casing 24 of the differential 16, with the interposition of tapered roller bearings 59. The tubular element 58 has a portion 32a which is formed as a bevel pinion and is adapted to mesh with the corresponding ring bevel gear 33 fixed for rotation with the hub 35 which is mounted for rotation relative to the differential casing 24 with the interposition of tapered roller bearings 60. Similarly, the ring bevel gear portion 36a of the planet carrier 36 meshes with the corresponding ring bevel gear 37 keyed to the hub 39 which is mounted for rotation relative to the differential casing 24 with the interposition of tapered roller bearings 61.

Figure 10:
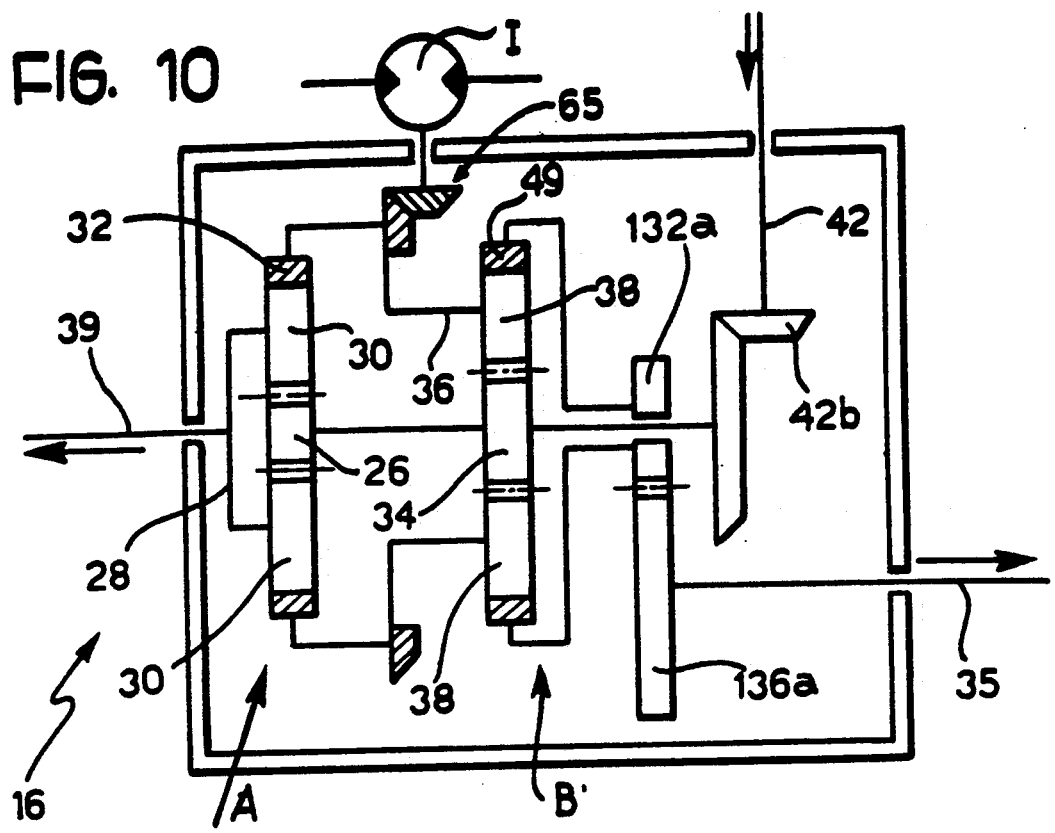
FIG. 10 is a schematic view of another embodiment of a differential according to the invention.
Figure 11:
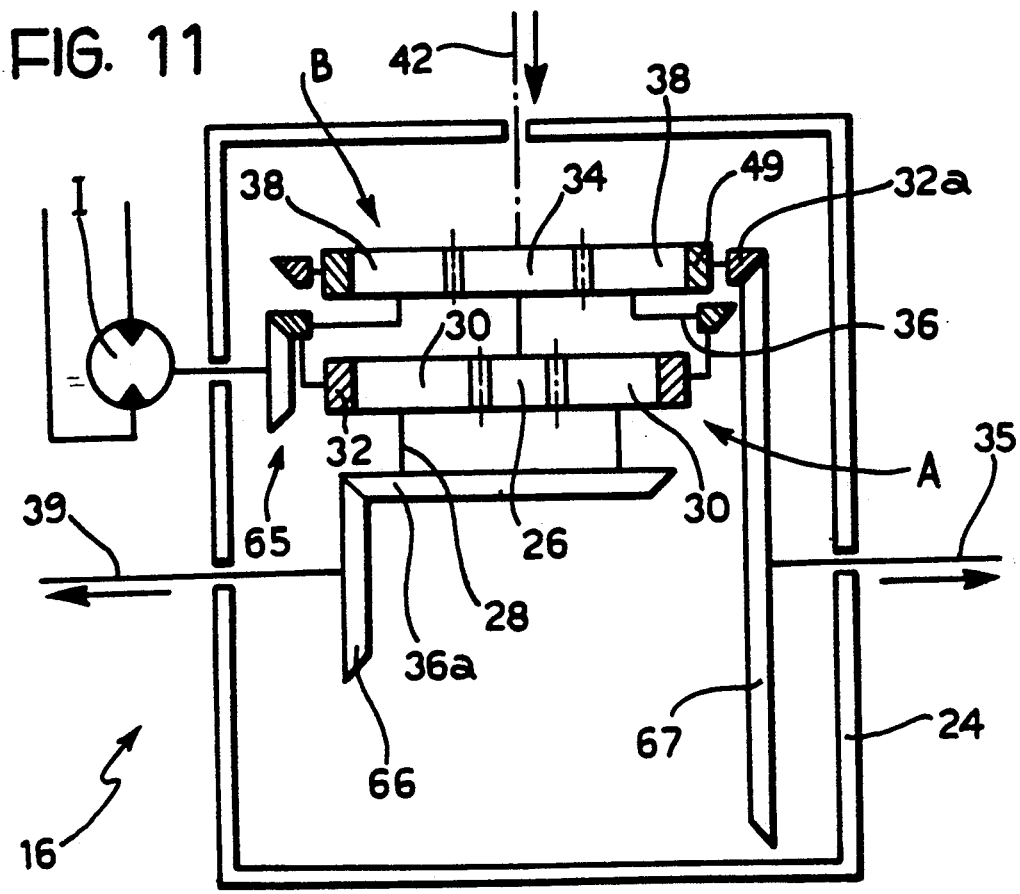
FIG. 11 is a schematic view of a further embodiment of the steering, differential.

FIGS. 10 and 11 show two further embodiments of the differential 16. With reference to FIG. 10, the two spur gears 132a and 136a which form part of the differential are not longer positioned one at each output of the differential 16, but are both arranged at a single output and mesh with each other in order to achieve the speed correction of the output to the reduction units 20 and also to correct the sense of the drive, since the output senses of the two trains A and B are different in this configuration. In this solution, the drive input by the shaft 42 takes place by means of a bevel pinion 42b which is adapted to transmit the drive to the sum gears 26 and 34. The planet carrier 36 of the second train B and the ring gear 32 of the first train A are rotated by the hydraulic motor I by means of a bevel gear pan 65 one of which is connected to both the carrier 36 and the ring gear 32. Again, in the solution of FIG. 10, if the ratios of the two epicyclic trains A and B are appropriately defined in accordance with the ratio between the gears 32a and 36a, the reaction torques of the planet carrier 36 of the second train B and the ring gear 32 of the first train A are identical and opposed (for given equal torques on the tracks C), so that reactions to the reversible hydraulic motor I are avoided.

The embodiment illustrated in FIG. 11 is similar in principle to that of FIG. 10 and differs from the latter in the different positioning of the epicyclic trains A and B, which are arranged with the axis X—X coincident with the axis of the input shaft 42. The outputs to the reduction units 20 are arranged in correspondence with bevel gears 67 and 66 which are meshed with corresponding bevel ring gears 32a and 36a keyed to the ring gear 49 of the second train B and to the planet carrier 28 of the first train A, respectively.

With reference to the embodiments illustrated in FIGS. 3-4, if the number of teeth of the spur or bevel gear 36a associated with the train B is indicated $N_{r'}$, the number of teeth of the spur or bevel gear 32a associated with the train A is indicated $N_{r''}$, and the number of teeth of the elements of the epicyclic trains is indicated $N_x$ (where x represents the reference numeral of the corresponding element), the following equation must apply for correct kinematic operation of the differential 16:

$$\frac{N_{49} = N_{34}}{N_{49} \cdot N_{r'}} = \frac{N_{32}}{(N_{32} + N_{26}) \cdot N_{r''}}$$

Similarly, for the embodiments illustrated in FIGS. 10-11, the following equation is established:

$$\frac{N_{32} + N_{26}}{N_{26}} = \frac{N_{49} \cdot N_{r'}}{N_{34} \cdot N_{r''}}$$

All the embodiments of the differential 16 described up to now have the same operating characteristics. With the reversible hydraulic motor I stopped, the vehicle will travel in a straight line. Moreover, when equal torques are required by the tracks C there will be zero torque on the reversible hydraulic motor I. The rotation of the hydraulic motor I connected to two different elements of the two trains A and B will cause steering to the right or the left in dependence on the sense of rotation of the hydraulic motor, without power loss, the speed of the inner track being reduced and that of the outer track being simultaneously increased and the average speed of the vehicle consequently being maintained. The average steering radius depends both on the rate of rotation of the hydraulic motor I and on the average speed of the vehicle. If the rate of rotation of the hydraulic motor I is kept constant, the steering radius of the vehicle will decrease as the average speed decreases; in fact, at an average speed of zero the vehicle will rotate about itself, since the tracks C will be counter-rotating.

It is understood that, the principle of the invention remaining the same, the forms of embodiment and details of construction may easily be varied with respect to those described and illustrated in the drawings, without thereby departing from the scope of the present invention.

What is claimed is:

1. A tracked vehicle including an internal combustion engine, track drive wheels, an epicyclic steering differential driven by the engine and adapted to rotate the drive wheels, and a reversible auxiliary motor operatively associated with the differential for operating the steering of the vehicle, wherein:
    a differential includes first and second epicyclic trains having a common central axis and each provided with a sun gear, a planet carrier and a ring gear mutually cooperating with each other;
    the internal combustion engine being connected for rotation with the planet carrier of the first epicyclic train and the ring gear of the second epicyclic train respectively, the planet carrier of the first epicyclic train and the ring gear of the second epicyclic train being connected for rotation with each other about the central axis,
    the auxiliary motor being connected for rotation with the sun gears of the first and second epicyclic trains respectively, the sun gears being connected for rotation with each other about the central axis,
    the differential having output means connected with the ring gear of the first epicyclic train and the planet carrier of the second epicyclic train, and
    speed reduction means connected between the output means and the drive wheels.

2. A vehicle according to claim 1, including a differential casing fixed to the vehicle structure, wherein the differential includes:
    a first shaft arranged substantially longitudinally of the vehicle and supported for rotation by the casing, the first shaft being driven by the internal combustion engine and being keyed to the planet carrier of the first train and to the ring gear of the second train,
    a second shaft coaxial with the first shaft and mounted for rotation relative to the casing, the second shaft being rotated by the auxiliary motor and the respective sun gears of the first and second trains being keyed to the said second shaft,
    a first bevel gear supported by the casing for rotation coaxially with the first shaft and keyed to the ring gear of the first train,
    a second bevel gear supported by the casing for rotation coaxially with the second shaft and keyed to the planet carrier of the second train,
    a pair of hubs supported by the casing for rotation about an axis transverse the axis of the first and second shafts and adapted to rotate the drive wheels, and
    a pair of ring bevel gears keyed to the hubs respectively and meshed with the first and second bevel gears respectively.

* * * * *